Patented Feb. 20, 1940

2,190,789

UNITED STATES PATENT OFFICE 2,190,789

POLYMERIZABLE OILS

Leo Philip Hubbuch, Springfield, Pa., assignor to E. I. du Pont de Nemours & Company, Wilmington, Del., a corporation of Delaware No Drawing. Application December 1, 1936, Serial No. 113,705

13 Claims. (Cl. 260—22)

This invention relates to materials useful in the coating art, and more particularly to new products comprising polymerizable film-forming oils and to methods for preparing them.

Resinous film-forming materials have been made by including in the reaction mixture of polyhydric alcohol and polycarboxylic acid a low molecular weight unsaturated monocarboxylic acid. The products thus obtained are fully condensed and resinous. The present invention, on the other hand, is concerned with products which although polymerizable are initially oily and non-resinous and which are made by a different procedure of reacting the ingredients, this procedure requiring the use of an unsaturated acid not disclosed in the manufacture of the above mentioned resinous materials.

This invention has as an object the preparation of new and useful materials. A further object is the production of new polymerizable oils useful in coating compositions. A further object is to provide liquid, polymerizable oil-modified polyhydric alcohol-polycarboxylic acid esters which are capable of forming harder, faster drying films than are standard alkyd resins. A still further object is to provide new and improved heat-hardening coating compositions. Other objects will appear hereinafter.

The products of the present invention are the reaction products of methacrylic anhydride, or equivalent compound furnishing the methacrylyl radical, with a polyhydric alcohol but partially esterified with a polycarboxylic acid and a fatty oil acid. These compounds are then polyhydric alcohols whose hydroxyl hydrogen atoms are substituted by the acid radicals of polycarboxylic acid, methacrylic acid, and a higher fatty acid, i. e., they are polyhydric alcohol mixed esters of these acids. In the manufacture of my new products, a polycarboxylic acid or its anhydride is first reacted with a polyhydric alcohol partially esterified with drying, semi-drying, or non-drying oil acids; this reaction is conducted in such a manner that only part of the remaining hydroxyl groups are esterified. The resulting oily reaction product is then heated at a temperature not substantially above 110° C. with methacrylic anhydride. The latter reaction is carried out in the presence of a non-reactive volatile solvent, and preferably in the presence of fused sodium acetate or similar substance which desirably promotes the reaction, until a substantial proportion of the remaining free hydroxyl groups of the polyhydric alcohol are esterified, discontinuing the heating while the reaction product is still substantially unpolymerized and soluble in toluene, removing acidic ingredients by agitating the reaction mixture with an aqueous solution or suspension of calcium hydroxide, filtering, and concentrating the filtrate until a solution of the desired concentration, or only the oily reaction product, is obtained.

The inert or non-reactive volatile solvent in which the reaction is carried out may be an ether or a hydrocarbon, either aliphatic or aromatic, boiling between about 60° C. and 200° C. The reaction generally is best carried out by heating the reactants at about 80–90° C. for about four hours, preferably with constant stirring. The methacrylic anhydride reacts with the free hydroxyl groups of the partially esterified polyhydric alcohol to form the desired ester and free methacrylic acid. When the reaction is substantially complete, but before the product becomes insoluble in toluene, the reaction mixture is cooled, filtered to remove sodium acetate, treated with an aqueous solution of calcium hydroxide to remove acidic ingredients, and again filtered. The clear filtrate contains the desired polyhydric alcohol mixed ester of polycarboxylic acid, fatty oil acid, and methacrylic acid. If desired the oily ester can be obtained by evaporating the solvent.

The process used in this invention may, for a clear understanding thereof, be viewed as consisting of three steps, viz.: (1) preparation of a fatty oil monoglyceride (or other ester of a polyhydric alcohol with the acids of a fatty oil) in which at least two of the hydroxyl groups of the polyhydric alcohol remain unesterified, (2) reaction of a mixture of the fatty oil monoglyceride and glycerol with a polycarboxylic acid to form an incompletely esterified fatty oil glyceride ester of the polycarboxylic acid, and (3) reaction of the product of step (2) with methacrylic anhydride. The first two steps may be unnecessary if the reaction products thereof are available and do not have to be made. The third step is the essential part of the invention.

Before turning to the examples giving detailed procedure for making my new esters through additional or complete esterification with methacrylic acid of the product of step (2), namely, polyhydric alcohol partially esterified with polycarboxylic acid and a fatty oil acid, reference will first be had to the production of the fatty oil monoglyceride mentioned in step (1) above and its further reaction with polycarboxylic acid to yield the mentioned product that is finally reacted with the methacrylic acid.

The fatty oil monoglycerides may be prepared by heating two mols of glycerol with one mol of the fatty oil in the presence of catalytic proportions of litharge or other alcoholysis catalyst. The preparation of three representative monoglycerides is, for example, conducted as follows:

Preparation of soya bean oil monoglyceride. A mixture of 872 g. (1 mol) of raw soya bean oil, 194 g. (2 mols) of water-white glycerol, and 0.9 g. of litharge is placed in a 2-liter, 3-necked flask fitted with a reflux condenser, thermometer, stirrer, and blowing tube. The mixture is blown gently with nitrogen, stirred rapidly and heated for two hours at 200° C. The contents of the flask are then cooled somewhat and filtered by suction, the material in the funnel being kept warm with a steam coil during the filtration. The filtrate is the soya bean oil monoglyceride, a dark brown oily liquid.

Preparation of China-wood oil monoglyceride. This monoglyceride may be prepared in substantially the same manner as soya bean oil monoglyceride described above, using 290 g. of China-wood oil, 66 g. of 95% glycerol, and 0.3 g. of litharge, the reaction temperature being 181–216° C. and the reaction period one hour.

Preparation of linseed oil monoglyceride. Four hundred thirty-nine g. (0.5 mol) of alkali refined linseed oil, 98 g. (1.01 mols) of 95% glycerol, and 0.5 g. of litharge are heated with stirring at 160–246° C. for 1¼ hours. The saponification number of the product is about 152, as compared with a theoretical value of 158.5.

The products of the next, or second step, are still incompletely esterified esters of the polyhydric alcohol and furnish free hydroxyl groups which are partially, or perhaps completely, esterified in the third or final step. The following are three instances of the preparation of mixed polyhydric alcohol esters of polycarboxylic and fatty oil acids, these esters containing free hydroxyl groups and made from the monoglycerides given above:

Preparation of the partial phthalic ester soya bean oil monoglyceride. A mixture of 502 g. of soya bean oil monoglyceride, 194 g. of phthalic anhydride, and 65 g. of water-white 95% glycerol is placed in a 2-liter, 3-necked flask, fitted with a stirrer, thermometer, blowing tube, and short air-reflux condenser. The charge is stirred rapidly, blown with carbon dioxide and heated for 5.25 hours at 225° C. The product is a clear, yellow, balsam-like material, having an acid number of about 0.6. Practically theoretical yields are obtained.

Preparation of the partial phthalic ester of China-wood oil monoglyceride. A mixture of 580 g. of a 30.5% toluene solution of China-wood oil monoglyceride, 24.3 g. of 95% glycerol, and 74 g of phthalic anhydride is heated with stirring at 107–160° C. for ten hours. The product, after removal of toluene, has an acid number of about 12 and a hydroxyl number of about 190.

Preparation of the partial phthalic ester of linseed oil monoglyceride. Five hundred and twenty-eight g. (1.49 mols) of linseed oil monoglyceride, 72 g. (0.75 mol) of 95% glycerol, and 220 g. of phthalic anhydride are heated with stirring at 124–185° C. for five hours. The acid number of the product is about 45, and the hydroxyl number about 140. The product is a viscous brown syrup soluble in cold toluene.

The third or final step mentioned above, which is the essential part of my invention, is illustrated by the following examples:

EXAMPLE I

*Preparation of a glycerol mixed ester of phthalic, methacrylic, and soya bean oil acids*

The following mixture was placed in a 12-liter, 2-necked flask equipped with a mechanical stirrer and a reflux condenser:

| | |
|---|---|
| Partial phthalate of soya bean oil monoglyceride | 1637 g. (3.75 mols) |
| Methacrylic anhydride | 871 g. (5.65 mols) |
| Sodium acetate, fused | 1083 g. (13.2 mols) |
| Dry toluene | 4430 g. |

The flask and its contents were heated on a steam bath at 79–87° C. with constant stirring for four hours, then allowed to cool overnight. The reaction mixture was filtered by suction and the residue was washed with three 500 cc. portions of toluene. The filtrate and washings were then placed in a 12-liter flask together with 225 g. of water and 750 g. of calcium hydroxide and the mixture was stirred mechanically for about 16 hours. It was then suction filtered and washed with toluene as before, the combined filtrate and washings then being concentrated in vacuo at 40° C. until there was obtained 2935 g. of a clear, yellow, practically neutral solution of low viscosity containing 57.4% of non-volatile material and having an acid number of 0.32. The yield of this glycerol mixed ester of phthalic, methacrylic, and soya bean oil acids was thus 88% of theory. The analytical data indicated that all the hydroxyl groups of the partial phthalate of the soya bean oil monoglyceride had been methacrylated.

A sample of the resin solution described in the preceding paragraph heated for about an hour at 100° C. in the presence of 1% benzoyl peroxide polymerized to a rubbery, insoluble, friable, yellow solid.

Approximately 50% solutions were prepared as follows: (1) original partial phthalic ester of soya bean oil monoglyceride and 0.03% cobalt (as the linoleate) in toluene; (2) same as (1) except 1% benzoyl peroxide substituted for the cobalt drier; (3) the glycerol mixed ester of phthalic, methacrylic, and soya bean oil acids of Example I and 0.03% cobalt (as the linoleate) in toluene; (4) solution same as (3) but containing 1% benzoyl peroxide instead of the cobalt drier. Films of these solutions were flowed on glass and baked at 100° C. until they were no longer tacky on cooling. It was found that (1) and (2) set up to only soft films even after 16 hours' baking, whereas (3) set up to a hard film in one hour and (4) to a hard film in 6–8 hours.

The product of Example I was made up to a 35% solution in toluene and 30 g. portions of the solution were pigmented by grinding in ball mills for 3 days with 8.9 g. portions of titanium dioxide and zinc oxide, respectively. A standard 50% soya bean oil modified phthalic glyceride resin used in commercial baking finishes was employed for making a similar set of grinds which were used as controls. Two gram portions of each of the grinds were mixed with 0.01 g. of a cobalt linoleate drier solution containing 2% cobalt (0.03% cobalt based upon the resin) and flowed on glass plates. The films were allowed to dry in air for 0.5 hour and then placed in a 100° oven. Tests were removed from the oven at intervals of 1, 2, and 4 hours, allowed to cool to room temperature, and examined. The condition of the films was as follows:

| | Vehicle | Pigment | Condition of films after baking at 100° C. for— | | |
|---|---|---|---|---|---|
| | | | One hour | Two hours | Four hours |
| 1 | Product of Example I | None | Clear, tack-free, tough | Same | Same. |
| 2 | do | TiO$_2$ | Tacky | Slightly tacky | Tack-free, tough. |
| 3 | do | ZnO | Tack-free | Same | Same. |
| 4 | Standard soya bean oil-modified alkyd resin. | None | Soft, slightly tacky | Tack-free but softer than (1). | Same as (1). |
| 5 | do | TiO$_2$ | Slightly tacky | do | Tack-free but softer than (1), (2), or (3). |
| 6 | do | ZnO | Same as (5) | Same as (5) | Same as (5). |

The superiority of my new compositions over standard oil-modified alkyd resins is evident from the results given in the table above.

EXAMPLE II

*Preparation of a glycerol mixed ester of phthalic, metacrylic, and China-wood oil acids*

A mixture of 300 g. of a 43.88% solution of the partial phthalic ester of China-wood oil monoglyceride, 77 g. of methacrylic anhydride, 125 g. of fused sodium acetate, and 188 g. of toluene was heated at about 95° C. for 8 hours. The reaction product was then purified as described in Example I. The acid number of the resulting mixed glyceride was 1.47 and the hydroxyl number 60.4%, indicating that 61% of the hydroxyl groups had been methacrylated.

Films of this ester containing 0.03% cobalt as cobalt linoleate dried tack-free in one hour when heated at 100° C.

EXAMPLE III

*Preparation of a glycerol mixed ester of phthalic, methacrylic, and linseed oil acids*

A mixture of 90 g. of the partial phthalic ester of linseed oil monoglyceride, 31 g. of methacrylic anhydride, 33 g. of fused sodium acetate, and 270 g. of dioxan was heated with constant stirring on a steam bath at 90-95° C. for four hours. The reaction mixture was then treated with lime as described in Example I, and the dioxan evaporated off. The oily product had an acid number of 0.84 and a hydroxyl number of 104.3, indicating that 22.8% of the hydroxyl groups had been methacrylated. A 76% yield was obtained. The product was soluble in toluene, dioxan, and the usual resin solvents. When baked at 100° C. for one hour, a thin film of the product containing 0.03% cobalt (as cobalt linoleate) dried to a clear, almost colorless, very hard film.

The methacrylic anhydride used in this invention may be prepared as follows:

Two hundred fifty cubic centimeters of thionyl chloride is added dropwise to a well-stirred paste of 877 g. of potassium methacrylate and 750 g. of dry benzene, in a flask fitted with a stirrer, reflux condenser, and dropping funnel. The whole charge is then heated one hour on a steam bath. The volatile material is vacuum distilled through a short Claisen column, the flask during this distillation being immersed to its neck in an oil bath heated at the proper temperature. The fraction boiling between 75-80° C./9 mm. is collected. The yield is usually about 75% of theory. The product is a clear, colorless thin liquid having lachrymatory properties.

While some of the polyhydric alcohol mixed esters of this invention set up at ordinary temperatures in the presence of metallic driers to films which are hard enough for some purposes, most of them form somewhat tacky films under such conditions and require baking in the presence of a drier or of a peroxide such as benzoyl peroxide to form hard, serviceable films. The most useful driers are those ordinarily used in oil-type coating compositions in the paint and varnish arts. Cobalt linoleate has been found particularly useful in this invention for promoting the formation of hard, dry films of the esters described herein.

Properly dried films of the esters described herein are no longer soluble in, but may be more or less swelled by organic solvents. Pigmented films of the esters generally possess the fast drying properties of the unpigmented esters. When pigmented with titanium dioxide, however, the esters tend to set up to hard, dry films somewhat more slowly than with other pigments or than when unpigmented. Even with titanium dioxide, however, these esters set up in approximately the same time as do corresponding compositions containing the usual oil modified alkyd resins.

As previously mentioned, the methocrylated products of this invention are liquid oils rather than resins. That is, they are in a very low degree of polymerization, and the methacrylyl groups are in a substantially unpolymerized state. They are obtained in this form by the use of relatively low reaction temperatures supplemented by the use of methacrylic anhydride, special catalysts, and of hydrocarbon or ether solvents boiling in the range of about 60-200 C. When the oils are heated at higher temperatures, particularly in the presence of polymerization and/or oxidation catalysts, they set up quickly to hard, insoluble resinous products. My new oily products are therefore advantageously used in quick-drying coating compositions.

Additional examples of inert solvents for carrying out the reaction are such ethers as di-n-propyl, di-n-butyl, di-iso-butyl, di-sec-butyl, and di-n-amyl ethers; propyl butyl ethers; 1,4-dioxan; and $\beta,\beta$-dichlorodiethyl ether. Examples of suitable hydrocarbons are the heptanes, octanes, nonanes, decanes, cyclohexane, benzene, toluene, the xylenes and mesitylenes. Mixtures of ethers and hydrocarbons can, if desired, be employed.

Sodium acetate is most effective in promoting the reaction although there may be used other organic acid-alkali metal salts such as potassium methacrylate, potassium propionate, sodium butyrate, lithium acetate, sodium succinate, potassium phthalate, etc. The proportions of sodium acetate or other catalytic salt may be varied over wide limits, but it is preferable to use at least 1.25 mols of the fused salt per mol of methacrylic anhydride.

The phthalic anhydride used in the examples can be replaced with other polycarboxylic acids or their anhydrides such as succinic, adipic, sebacic, maleic, diglycolic, diphenic, quinolinic, tartaric, citric, and terephthalic acids.

Polyhydric alcohols which may be used in place of glycerol include pentaerythritol, mannitol, sorbitol, arabitol, xylitol, hannitol, ethylene glycol, diethylene glycol, hexamethylene glycol, diglycerol, etc.

Methacrylic anhydride is more advantageously used in the practice of this invention than the free acid itself since polymerized products are largely obtained with the acid due to the prolonged heating necessary to esterify the free hydroxyl groups of the incompletely esterified polyhydric alcohol with which the methacrylic acid is reacted. Similarly, esterifying derivatives of methacrylic acid other than the anhydride may be used but have various disadvantages which make their use undesirable. Thus, methacrylyl chloride produces less satisfactory products and complicates the procedure since unreacted portions are difficult to remove and inhibit the rapid set-up to hard films.

The fatty oil monoglyceride has been described as prepared by reacting glycerol with the desired fatty oil. If desired, however, such monoglycerides can be prepared in other ways, such as by partial esterification of glycerol with fatty oil acids, anhydrides, etc. Products more or less resembling those described herein may also be prepared by partially esterifying glycerol or other polyhydric alcohol with natural resin acids such as abietic and/or with a saturated or unsaturated aliphatic monocarboxylic acid containing at least 12 carbon atoms, and using the product, instead of the fatty oil monoglyceride, in step (2) of the invention. Examples of such acids are lauric, oleic, ricinoleic, linolenic, myristic, eleostearic, stearic, and the like. Any one of the monocarboxylic acids obtained by saponification of fatty oils can be used to prepare the monoglyceride or other polyhydric alcohol esters, and the esters so made may be substituted for the fatty oil monoglycerides used in step (2) of the invention. Mixtures of monocarboxylic aliphatic acids containing at least 12 carbon atoms with each other or with fatty oils may likewise be used to prepare monoglycerides or partially esterified esters of other polyhydric alcohols.

The properties of the products described herein are determined to a considerable degree by the proportions of methacrylyl groups which they contain. The proportions of methacrylic anhydride to fatty oil glyceride-polycarboxylic acid ester to be used in step (3) of this invention will accordingly depend upon the degree of hardness, rapidity of set-up, etc., desired in films of the final products. An excess of methacrylic anhydride over that required to react with the free hydroxyl groups of the product of step (2) of this invention is often necessary, but complete methacrylation is not always obtained. Products having improved dryness and hardness characteristics can be prepared containing as little as 8% by weight of the methacrylyl radical, and there is generally no advantage because of increased brittleness and poorer adherence of the film in making products containing more than about 16% thereof. In some cases, however, as in the case of the glycerol mixed ester of phthalic, methacrylic, and stearic acids, somewhat higher proportions of methacrylyl are necessary to secure sufficient hardness in the polymerized or dried films. The oil monoglyceride, the polybasic acid anhydride (e. g., phthalic anhydride), glycerol, and methacrylic anhydride used in the preferred embodiment of this invention should be employed in the approximate molar proportions 2:2:1:3, which gives a balanced formula in which none of the reactants are used in excess (assuming that each molecule of the methacrylic anhydride esterifies only one hydroxyl group).

The duration of the reaction period and the reaction temperatures will depend upon the type of product being prepared. The temperature and duration of heating required to introduce large proportions of methacrylyl radicals into polyhydric alcohols partially esterified with polycarboxylic acids and drying oil acids is such as often to cause gelation of the reaction mixture (due to polymerization of the drying oil residues) and the formation of insoluble, infusible products of little value. Consequently, when it is desired to methacrylate such esters, the reaction must be stopped before the product becomes insoluble in the usual solvents such as toluene. In such cases, the degree of methacrylation is generally low, as indicated in Example III. On the other hand, polyhydric alcohol partial esters of polycarboxylic acids and non-drying or semi-drying oil acids, gelation does not occur so readily and the reactions can be continued until a larger proportion of the hydroxyl groups are methacrylated and, accordingly, larger proportions of methacrylic anhydride can be employed without waste. These considerations should be taken into account in determining the proportion of methacrylic anhydride to be employed in any particular reaction, somewhat smaller amounts of methacrylic anhydride being used for the sake of economy when drying oil modified polyhydric alcohol-polycarboxylic acid esters are to be methacrylated and larger amounts being employed for reaction with semi- and non-drying oil esters.

The products of this invention, as previously indicated, are valuable ingredients of coating compositions, alone or in admixture with natural or synthetic resins, or with vegetable or animal oils, fats, waxes, plasticizers, pigments, dyes, fillers, etc. These coating compositions are characterized by very fast set-up, excellent hardness, and stability against discoloration by light. These esters may also be used for coating, impregnating, or sizing cellulosic materials such as textiles and paper, or for coating all sorts of surfaces such as wood, metals, brick, stone, concrete, etc.

The new esters are particularly valuable as ingredients of enamels, primers, etc., which set up to hard, substantially insoluble films when baked at elevated temperatures.

The compositions of matter described herein constitute a new class of fast-drying, heat-hardening polymerizable oils which set up to remarkably hard, tough, flexible films on baking. They are not only markedly superior in speed of drying and hardness to the usual oil-modified alkyd resins now on the market but, being very soluble and easily dispersible oils instead of resins, lend themselves more readily to the formation of coating compositions. Their stability to light on aging makes them particularly valuable as ingredients of very light colored coating compositions, the utility of which would be seriously impaired by discoloration.

As many apparently widely different embodiments of this invention may be made without departing from the spirit and scope thereof, it is to be understood that I do not limit myself to the specific embodiments thereof except as defined in the appended claims.

I claim:

1. A composition of matter comprising the polymerizable liquid product obtained by reacting methacrylic anhydride with polyhydric alcohol incompletely esterified with polycarboxylic acid and fatty oil acid.

2. The composition of matter set forth in claim 1 in which the polyhydric alcohol is glycerol and the polycarboxylic acid is phthalic anhydride.

3. In a process for making liquid polymerizable polyhydric alcohol esters of polycarboxylic acid, monocarboxylic acid, and methacrylic acid, the steps which comprise heating, in an inert solvent to reaction temperature and not substantially above 110° C., methacrylic anhydride and polyhydric alcohol partially esterified with a polycarboxylic acid and an aliphatic monocarboxylic acid containing at least 12 carbon atoms.

4. The process set forth in claim 3 in which said aliphatic monocarboxylic acid is derived from fatty oil.

5. In a process for making liquid polymerizable polyhydric alcohol esters of polycarboxylic acid, monocarboxylic acid, and methacrylic acid, the steps which comprise reacting, in an inert solvent in the presence of an alkali metal acetate at a temperature not substantially above 110° C., methacrylic anhydride and polyhydric alcohol partially esterified with polycarboxylic acid and fatty oil acid, discontinuing the heating after substantial esterification by the methacrylic anhydride of the remaining free hydroxyl groups and while the reaction product is still substantially unpolymerized and soluble in toluene, and neutralizing the product obtained, said inert solvent being selected from the class consisting of ethers and hydrocarbons boiling from about 60° C. to about 200° C.

6. The process set forth in claim 5 in which said alkali metal acetate is sodium acetate.

7. The process set forth in claim 5 in which the polyhydric alcohol is glycerol, the polycarboxylic acid is phthalic acid, and is used as the anhydride, and the alkali metal acetate is sodium acetate.

8. A process which comprises heating, from 80 to 90° C. in toluene in the presence of an inert organic solvent and fused sodium acetate, methacrylic anhydride with the product obtained by incompletely esterifying drying oil monoglyceride with phthalic anhydride, discontinuing the heating after substantial reaction of the methacrylic acid and said product but while the reaction product thus obtained is still liquid and substantially unpolymerized and soluble in toluene, and neutralizing the product with calcium hydroxide.

9. The process set forth in claim 8 in which said inert solvent is toluene.

10. The process set forth in claim 8 in which said inert solvent is dioxan.

11. A liquid oily non-resinous polymerizable polyhydric alcohol mixed ester of a polycarboxylic acid, a monocarboxylic acid of at least 12 carbon atoms, and methacrylic acid.

12. A liquid oily non-resinous polymerizable glycerol mixed ester of phthalic acid, fatty oil acids, and methacrylic acid.

13. The product set forth in claim 11 in which said monocarboxylic acid is derived from a fatty oil.

LEO PHILIP HUBBUCH.